(12) United States Patent
Miyagaki (10) Patent No.: US 11,872,846 B2
(45) Date of Patent: Jan. 16, 2024

(54) PNEUMATIC TIRE

(71) Applicant: Toyo Tire Corporation, Itami (JP)

(72) Inventor: Tsubasa Miyagaki, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 126 days.

(21) Appl. No.: 17/540,357

(22) Filed: Dec. 2, 2021

(65) Prior Publication Data

US 2022/0194140 A1    Jun. 23, 2022

(30) Foreign Application Priority Data

Dec. 21, 2020    (JP) .................................. 2020-211107

(51) Int. Cl.
*B60C 11/12* (2006.01)
*B60C 11/13* (2006.01)
*B60C 11/03* (2006.01)

(52) U.S. Cl.
CPC ........ *B60C 11/125* (2013.01); *B60C 11/0304* (2013.01); *B60C 11/1369* (2013.01); *B60C 11/1236* (2013.01); *B60C 2011/0341* (2013.01)

(58) Field of Classification Search
CPC ............... B60C 11/0304; B60C 11/125; B60C 11/1369; B60C 2011/1361
See application file for complete search history.

(56) References Cited

U.S. PATENT DOCUMENTS

| 2007/0125467 A1* | 6/2007 | Durand ............... B60C 11/0309 152/209.22 |
| 2010/0186861 A1 | 7/2010 | Ishiguro et al. |
| 2016/0137004 A1* | 5/2016 | Quantinet ........... B60C 11/0304 152/209.2 |
| 2017/0253090 A1* | 9/2017 | Wakizono ........... B60C 11/1204 |

FOREIGN PATENT DOCUMENTS

| DE | 10311430 A1 * | 9/2004 | ......... B60C 11/0302 |
| JP | 08067112 A * | 3/1996 | ......... B60C 11/1369 |
| JP | 2010-168006 A | 8/2010 | |

OTHER PUBLICATIONS

English machine translation of JP-08067112-A. (Year: 1996).*
English machine translation of DE-10311430-A1. (Year: 2004).*

* cited by examiner

*Primary Examiner* — Robert C Dye
(74) *Attorney, Agent, or Firm* — WHDA, LLP (57) ABSTRACT

A pneumatic tire includes: a first main groove and a second main groove extending in a tire circumferential direction; and a first land defined by the first main groove and the second main groove, wherein the first land includes a plurality of slits extending across the first land in a tire width direction and open to the first main groove and the second main groove, the plurality of slits include first slits each having a first raised portion where a part of a groove bottom is raised and second slits each having a second raised portion where a part of a groove bottom is raised to be lower than the first raised portion, the first raised portion includes a first (Continued)

sipe extending along a direction where the first slits extend, and the first slits and the second slits are arranged alternately with each other in the tire circumferential direction.

10 Claims, 5 Drawing Sheets

PNEUMATIC TIRE

BACKGROUND OF THE INVENTION

Field of the Invention

The present disclosure relates to a pneumatic tire.

Description of the Related Art

Patent Document 1 to be described below discloses a pneumatic tire provided, on land portions, with sub grooves (lateral grooves) extending in a tire width direction, in which raised portions are provided on groove bottoms of the sub grooves, and sipes extending along the sub grooves are provided on the raised portions. By providing the sipes, the sub grooves are made easy to move at the time when the pneumatic tire is in contact with a road surface, and snow that enters the sub grooves can be made easy to be discharged.

However, in the pneumatic tire of Patent Document 1, by providing the sipes on the raised portions, blocks which sandwich the sub grooves therebetween become easy to move. Therefore, steering stability tends to deteriorate though snow performance can be improved.

PRIOR ART DOCUMENT

Patent Document

Patent Document 1: JP-A-2010-168006

SUMMARY OF THE INVENTION

An object of the present disclosure is to provide a pneumatic tire capable of achieving both of snow performance and steering stability.

A pneumatic tire of the present disclosure includes:
a first main groove and a second main groove extending in a tire circumferential direction; and
a first land defined by the first main groove and the second main groove,
wherein
the first land includes a plurality of slits extending across the first land in a tire width direction and open to the first main groove and the second main groove,
the plurality of slits include first slits each having a first raised portion in which a part of a groove bottom is raised and second slits each having a second raised portion in which a part of a groove bottom is raised to be lower than the first raised portion,
the first raised portion includes a first sipe extending along a direction where the first slits extend, and
the first slits and the second slits are arranged alternately with each other in the tire circumferential direction.

DETAILED DESCRIPTION OF THE PREFERRED EMBODIMENTS

Hereinafter, an embodiment of a pneumatic tire will be described with reference to FIGS. 1 to 7. Note that a dimensional ratio of the drawing does not necessarily coincide with an actual dimensional ratio in each of the drawings, and dimensional ratios in the respective drawings do not necessarily coincide with each other.

In each of the drawings, a first direction D1 is a tire width direction D1 parallel to a tire rotation axis that is a rotation center of a pneumatic tire hereinafter, also simply referred to as a "tire") 1, a second direction D2 is a tire radial direction D2 being a diameter direction of the tire 1, and a third direction D3 is a tire circumferential direction D3 around the tire rotation axis.

In the tire width direction D1, the inner side is a side close to a tire equatorial plane S1, and the outer side is a side far from the tire equatorial plane S1. In the tire width direction D1, a first side D11 is also referred to as a first width direction side D11, and a second side D12 is also referred to as a second width direction side D12. In the tire radial direction D2, the inner side is a side close to the tire rotation axis, and the outer side is a side far from the tire rotation axis. In the tire circumferential direction D3, a first side D31 is also referred to as a first circumferential direction side D31, and a second side D32 is also referred to as a second circumferential direction side D32.

The tire equatorial plane S1 is a plane orthogonal to the tire rotation axis and located at a center of the tire 1 in the tire width direction D1, and the tire meridian plane is a plane including the tire rotation axis and orthogonal to the tire equatorial plane S1. A tire equator-line is a line along which an outer surface (a tread surface 2a to be described later) of the tire 1 in the tire radial direction D2 intersects with the tire equatorial plane S1.

Figure 1:
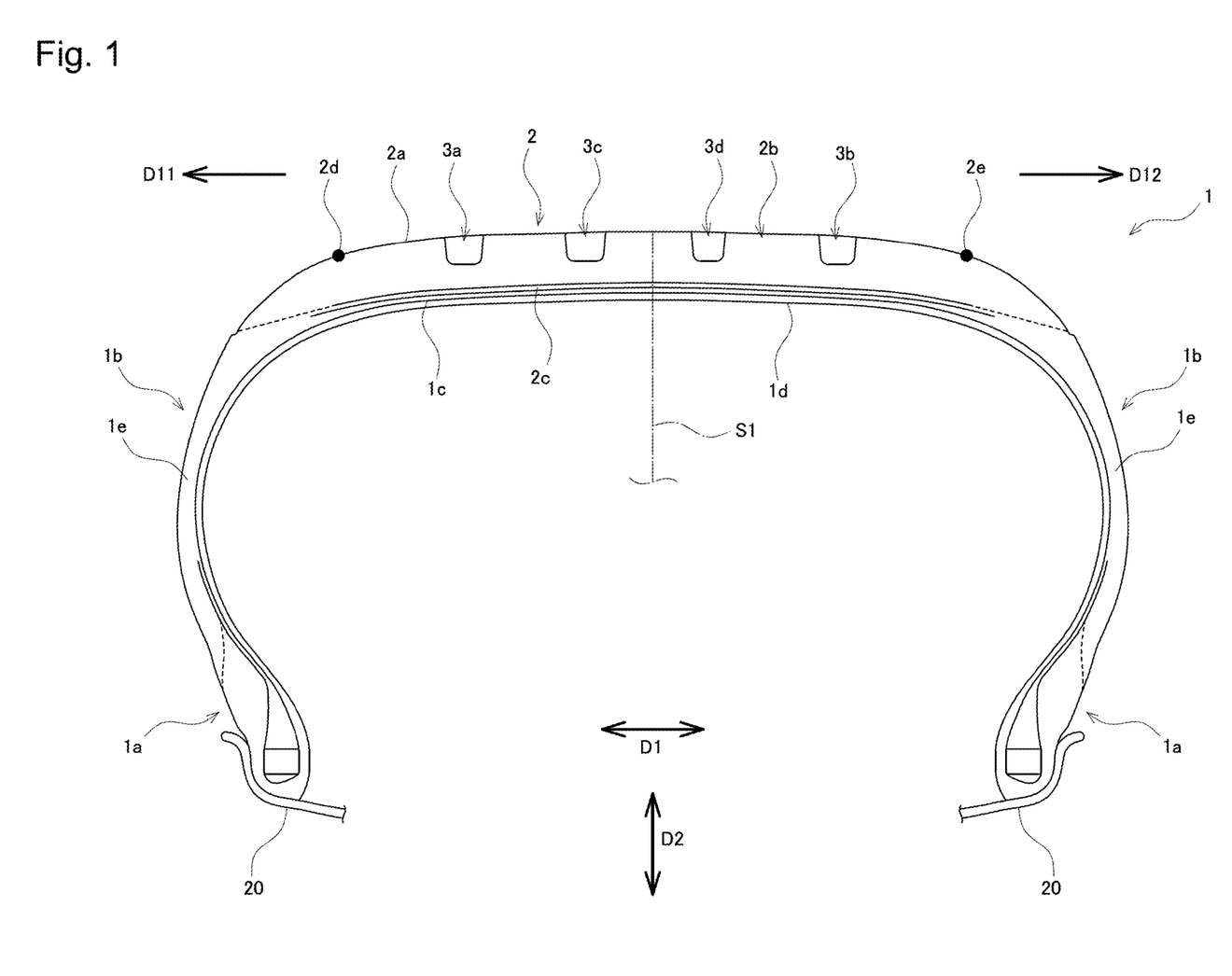
FIG. 1 is a cross-sectional view of a main part of a pneumatic tire according to an embodiment on a tire meridian plane.

As illustrated in FIG. 1, the tire 1 according to the present embodiment includes a pair of beads 1a having bead cores, sidewalls 1b extending outward in the tire radial direction D2 from the respective beads 1a, and a tread 2 connected to the outer ends of the pair of sidewalls 1b in the tire radial direction D2 and having an outer surface in the tire radial direction D2 that comes in contact with a road surface. In the present embodiment, the tire 1 is a pneumatic tire 1 to be inflated with air, and is mounted on a rim 20.

Further, the tire 1 includes a carcass 1c stretched between a pair of the bead cores, and an inner liner 1d disposed inside the carcass 1c and having an excellent function to prevent permeation of gas in order to maintain the air pressure. The carcass 1c and the inner liner 1d are disposed along the tire inner circumference over the beads 1a, the sidewalls 1b, and the tread 2.

The tire 1 has a structure asymmetric with respect to the tire equatorial plane S1. In the present embodiment, the tire 1 is a tire for which the following are designated: a direction in which the tire 1 is to be mounted on the vehicle; and which of the right and left sides of the tire 1 is to face the vehicle at the time of mounting the tire 1 on the rim 20. Note that a tread pattern formed on the tread surface 2a of the tread 2 has a shape asymmetric with respect to the tire equatorial plane S1.

The direction of the mounting on the vehicle is displayed on the sidewalls 1b. Specifically, each of the sidewalls 1b includes a sidewall rubber 1e disposed outside the carcass 1c in the tire width direction D1 so as to constitute a tire outer surface, and the sidewall rubber 1e has, on the surface thereof, a display portion (not illustrated) that displays the direction of the mounting on the vehicle.

For example, one of the sidewalls 1b, which is disposed on the inner side (hereinafter also referred to as "vehicle inner side") during the mounting on the vehicle, has a display (for example, "INSIDE" or the like) indicating the vehicle inner side. Further, for example, the other sidewall 1b disposed on the outer side (hereinafter also referred to as "vehicle outer side") during the mounting on the vehicle has a display (for example, "OUTSIDE" or the like) indicating the vehicle outer side. Though not particularly limited, for example, the first width direction side D11 may be a vehicle inner side D11, and the second width direction side D12 may be a vehicle outer side D12.

The tread 2 includes a tread rubber 2b having the tread surface 2a being in contact with the road surface, and a belt 2c disposed between the tread rubber 2b and the carcass 1c. The tread surface 2a has a ground contact surface that is actually in contact with the road surface, and the outer ends of the ground contact surface in the tire width direction D1 are referred to as ground contact ends 2d and 2e. Note that the ground contact surface refers to the tread surface 2a that is in contact with the road surface when the tire 1 is mounted on the normal rim 20, the tire 1 is placed perpendicularly to the road surface in a state where the tire 1 is filled with a normal internal pressure, and a normal load is applied.

In a standard system including a standard on which the tire 1 is based, the normal rim 20 is a rim 20 defined for each tire 1 by the standard and is, for example, a standard rim in the case of the Japan Automobile Tyre Manufacturers Association (JATMA), "Design Rim" in the case of the Tire and Rim Association, Inc. (TRA), or "Measuring Rim" in the case of the European Tyre and Rim Technical Organization (ETRTO).

Further, the normal internal pressure is an air pressure defined for each tire 1 by each standard in the standard system including the standard on which the tire 1 is based. The normal internal pressure is the maximum air pressure in the case of JATMA, the maximum value described in Table "TIRE LOAD LIMITS AT VARIOUS COLD INFLATION pressures" in the case of TRA, and "inflation PRESSURE" in the case of ETRTO, and when the tire 1 is for a passenger car, the normal internal pressure is set to 180 kPa.

The normal load is a load defined for each tire 1 by each standard in the standard system including the standard on which the tire 1 is based. The normal load is the maximum load capacity in the case of JATMA, the maximum value described in the above table in the case of TRA, and "LOAD CAPACITY" in the case of ETRTO, and when the tire 1 is for a passenger car, the normal load is 85% of the corresponding load of the internal pressure of 180 kPa.

Figure 2:
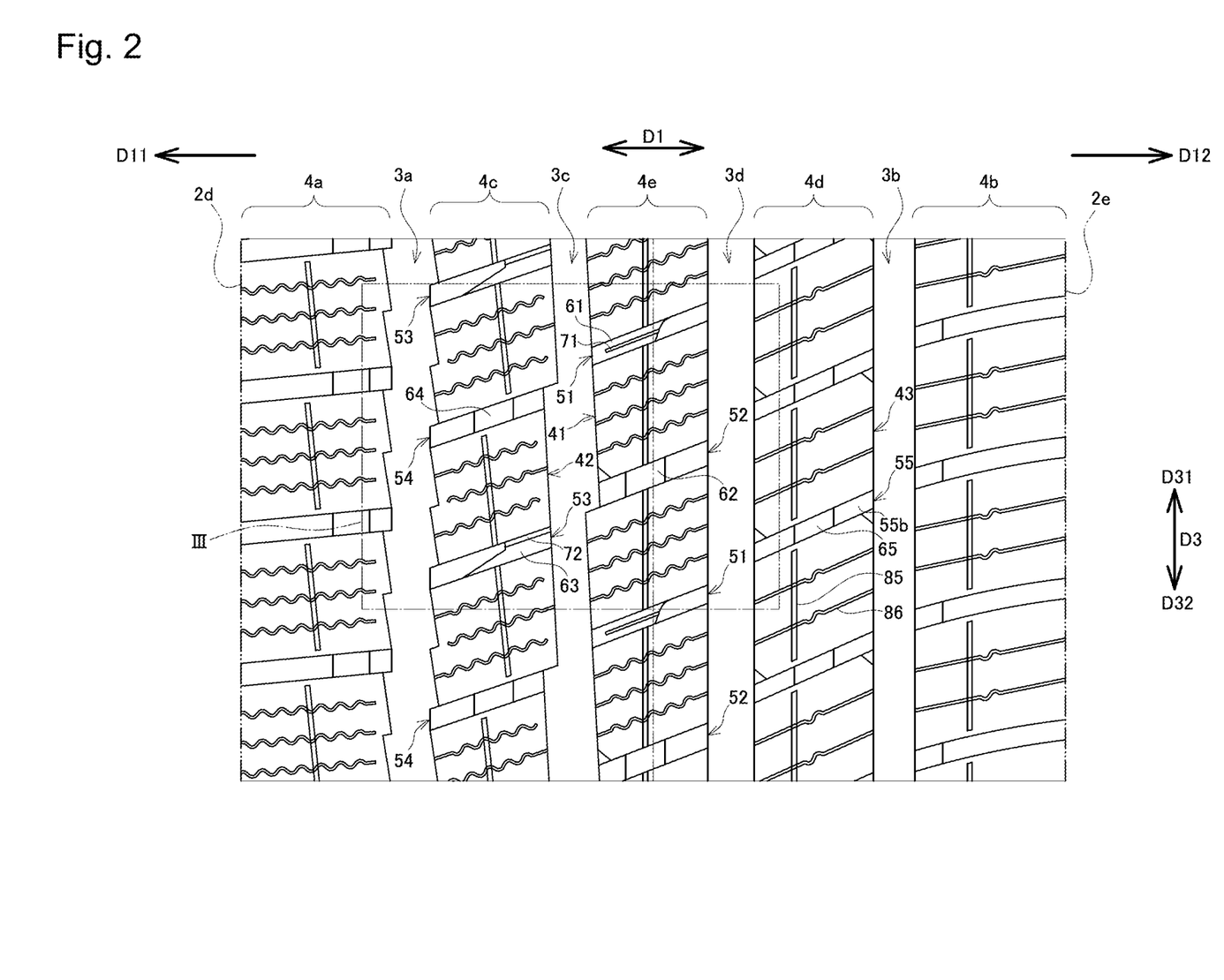
FIG. 2 is a developed view of a main part of a tread surface of the pneumatic tire according to the embodiment.

As illustrated in FIGS. 1 and 2, the tread rubber 2b includes a plurality of main grooves 3a to 3d extending in the tire circumferential direction D3. The main grooves 3a to 3d extend continuously in the tire circumferential direction D3. In the present embodiment, in terms of configuration, the main groove 3a and the main groove 3c are repeatedly inflected along the tire circumferential direction D3 and extend in a zigzag shape, and the main groove 3b and the main groove 3d extend linearly along the tire circumferential direction D3. However, the present embodiment is not limited to such a configuration. For example, in terms of configuration, the main groove 3a and the main groove 3c may extend linearly, and the main groove 3b and the main groove 3d may extend in a zigzag shape. Further, all the main grooves 3a to 3d may extend linearly or in a zigzag shape, or may extend in a wavy shape while being repeatedly curved.

The main grooves 3a to 3d may include, for example, portions which are so-called tread wear indicators (not shown) where the grooves are made shallow such that the degree of wear can be seen by exposure accompanied by wear. Further, for example, the main grooves 3a to 3d may have groove widths of 3% or more of the distance (dimension in the tire width direction D1) between the ground contact ends 2d and 2e. For example, the main grooves 3a to 3d may have groove widths of 5 mm or more.

The pair of main grooves 3a and 3b disposed on the outermost sides in the tire width direction D1 are referred to as shoulder main grooves 3a and 3b, and the main grooves 3c and 3d disposed between the pair of shoulder main grooves 3a and 3b are referred to as center main grooves 3c and 3d. Although the number of the main grooves 3a to 3d is not particularly limited, the number is four in the present embodiment.

The tread rubber 2b includes a plurality of lands 4a to 4e defined by the plurality of main grooves 3a to 3d and the pair of ground contact ends 2d and 2e. Although the number of the lands 4a to 4e is not particularly limited, the number is five in the present embodiment.

The lands 4a and 4b defined by the shoulder main grooves 3a and 3b and the ground contact ends 2d and 2e are referred to as shoulder lands 4a and 4b, and the lands 4c to 4e defined by the pair of adjacent main grooves 3a to 3d are referred to as middle lands 4c to 4e. Note that the lands 4c and 4d defined by the shoulder main grooves 3a and 3b and the center main grooves 3c and 3d are also referred to as quarter lands (also referred to as "mediate lands") 4c and 4d, and the land 4e defined by the pair of center main grooves 3c and 3d is also referred to as a center land 4e.

The center land 4e has first and second slits 51 and 52 extending in a direction inclined with respect to the tire width direction D1. A plurality of the first slits 51 and a plurality of the second slits 52 are arranged alternately with each other in the tire circumferential direction D3. The first and second slits 51 and 52 are connected to the main groove 3c and the main groove 3d, and are open to the main groove 3c and the main groove 3d. Thus, the center land 4e has a plurality of center blocks 41 divided in the tire circumferential direction D3 by the first and second slits 51 and 52. Further, it can also be said that the center blocks 41 are defined by the main groove 3c and the main groove 3d and by the first and second slits 51 and 52.

Figure 3:
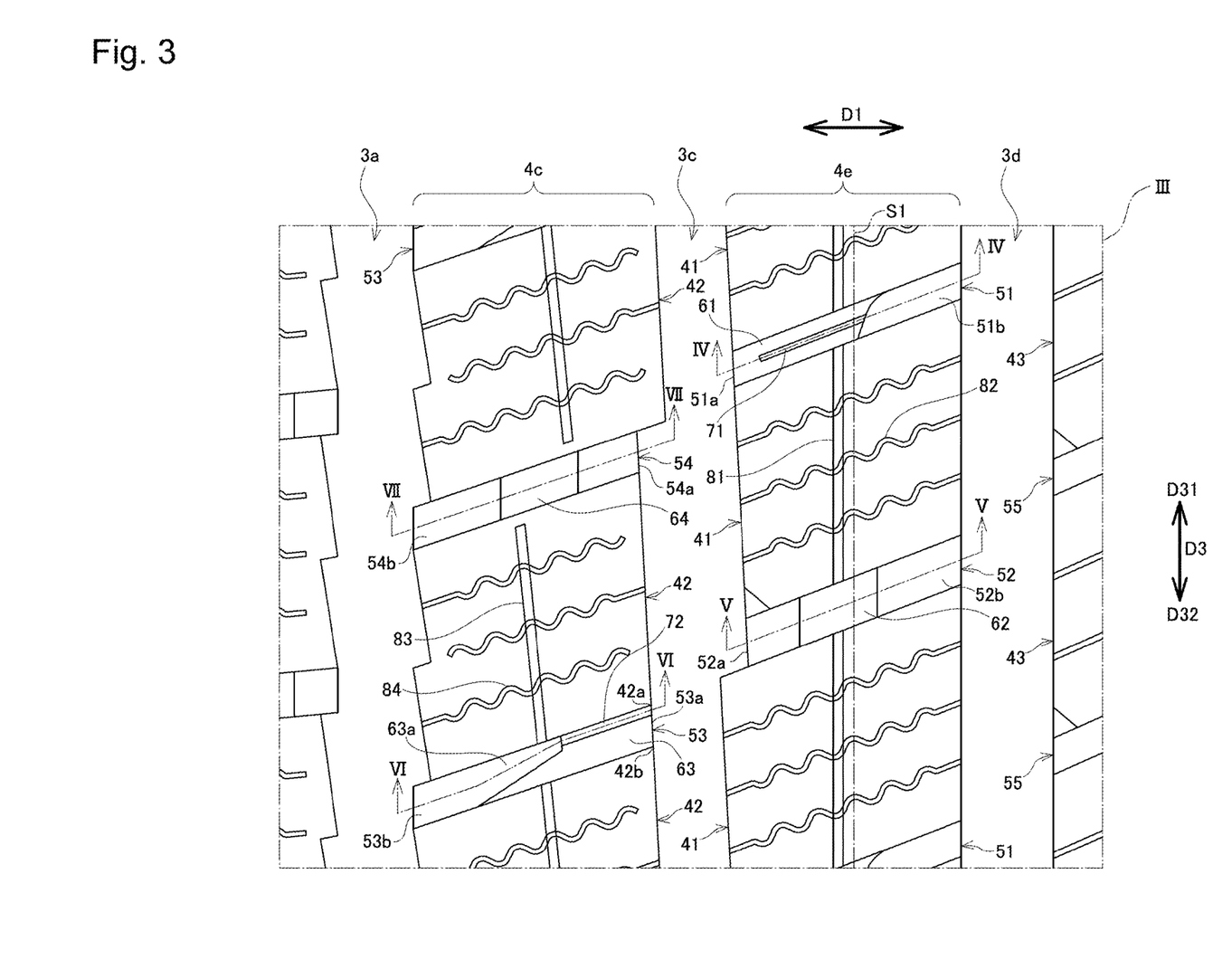
FIG. 3 is an enlarged view of a region III of the tread surface illustrated in FIG. 2.

As illustrated in FIGS. 2 and 3, the first and second slits 51 and 52 extend linearly. The first slits 51 and the second slits 52 are parallel to each other. Note that, in the present specification, "parallel" includes not only the case of being completely parallel but also the case of being substantially parallel with an intersection angle being 5 degrees or less (the same applies hereinafter).

Groove widths of the first slits 51 and the second slits 52 are narrower than the groove widths of the main grooves 3a to 3d. Further, the groove width of the first slits 51 is narrower than the groove width of the second slits 52. The groove width of the first slits 51 is, for example, 2 to 6 mm, and the groove width of the second slits 52 is, for example, 2.5 to 8 mm. In the present embodiment, the groove width of the first slits 51 is 3.5 mm, and the groove width of the second slits 52 is 4.8 mm.

A groove depth of the first slits 51 and the second slits 52 is 70 to 95% of a groove depth of the main grooves 3a to 3d. The groove depth of the first slits 51 and the second slits 52 is, for example, 5.5 to 8 mm, and the groove depth of the first slits 51 and the second slits 52 in the present embodiment is 7 mm.

Figure 4:
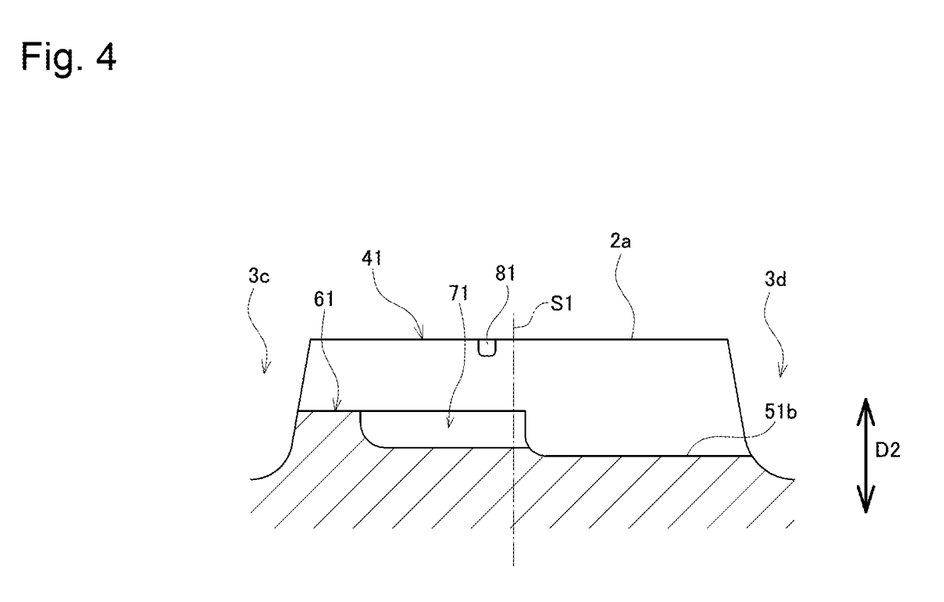
FIG. 4 is a cross-sectional view taken along a line IV-IV of the tread surface illustrated in FIG. 3.

FIG. 4 is a cross-sectional view taken along a line IV-IV of each of the first slits 51. The first slit 51 has a first raised portion 61 in which a part of a groove bottom is raised. The first raised portion 61 is disposed over the entire groove width of the first slit 51. The first raised portion 61 protrudes more outward than such a groove bottom 51b of the first slit 51 in the tire radial direction D2, and protrudes by 1.6 to 4 mm from the groove bottom 51b of the first slit 51. The first raised portion 61 of the present embodiment is higher by 2.7 mm than the groove bottom 51b. Further, the first raised portion 61 is lower than the tread surface 2a, and for example, is lower by 3 to 5.4 mm than the tread surface 2a. The first raised portion 61 of the present embodiment is lower by 4.3 mm than the tread surface 2a.

The first raised portion 61 is formed close to the main groove 3c in the first slit 51, and is in contact with the main groove 3c. Thus, deformation of the center block 41 present in the vicinity of the first raised portion 61 is suppressed, and therefore, a wiping phenomenon that the main groove 3c is narrowed due to the deformation of the center block 41 can be suppressed.

The first raised portion 61 includes a first sipe 71 extending along a direction where the first slit 51 extends. The first sipe 71 is formed in the center in the width direction of the first raised portion 61. The first sipe 71 is configured so that one end thereof is open and that the other end is terminated in the first raised portion 61. A groove depth of the first sipe 71 from a top surface of the first raised portion 61 is 1 to 4 mm. The groove depth of the first sipe 71 in the present embodiment is 2.2 mm. Further, the groove depth of the first sipe 71 is deeper than a groove depth of a second sipe 72 to be described later. A groove width of the first sipe 71 in the present embodiment is 0.6 mm.

Figure 5:
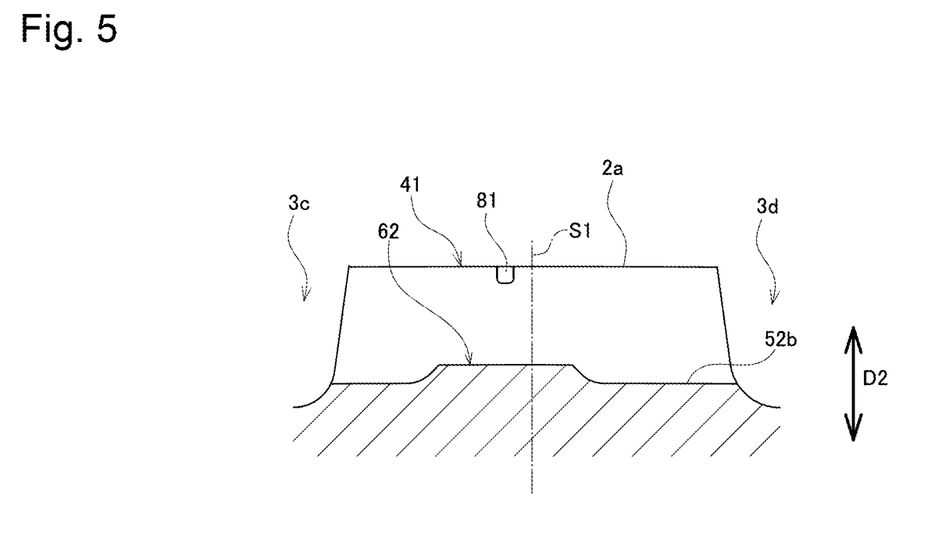
FIG. 5 is a cross-sectional view taken along a line V-V of the tread surface illustrated in FIG. 3.

FIG. 5 is a cross-sectional view taken along a line V-V of each of the second slits 52. The second slit 52 has a second raised portion 62 in which a part of a groove bottom is raised. The second raised portion 62 is disposed ever the entire groove width of the second slit 52. The second raised portion 62 is lower than the first raised portion 61. The second raised portion 62 protrudes more outward than such a groove bottom 52b of the second slit 52 in the tire radial direction D2, and protrudes by 0.5 to 3 mm from the groove bottom 52b of the second slit 52. The second raised portion 62 of the present embodiment is higher by 1.1 mm than the groove bottom 52b. Further, the second raised portion 62 is lower than the tread surface 2a, and for example, is lower by 4 to 6.5 mm than the tread surface 2a. The second raised portion 62 of the present embodiment is lower by 5.9 mm than the tread surface 2a.

The second raised portion 62 is formed in the vicinity of the center of the second slit 52 in the tire width direction D1. Further, the second raised portion 62 is formed so as to cross the tire equatorial plane S1. A length of the second raised portion 62 is shorter than a length of the first raised portion 61. Note that the second raised portion 62 does not include a sipe like the first sipe 71 of the first raised portion 61.

Each of the center blocks 41 includes a circumferential groove S1 and a plurality of crosswise sipes 82. The circumferential groove 81 is formed in the central portion in the tire width direction D1 of the center block 41. Both ends of the circumferential groove 81 are open to the first slit 51 and the second slit 52. Although not particularly limited, a groove width of the circumferential groove 81 may be set, for example, to 0.5 to 3.0 mm, and preferably, for example, is 1.0 to 2.0 mm (the same also applies to a circumferential groove 83 and a circumferential groove 85, which will be described later).

The plurality of crosswise sipes 82 are formed side by side in the tire circumferential direction D3. The crosswise sipes 82 extend so as to be parallel to the first slit 51 and the second slit 52. Both ends of the crosswise sipes 82 are open to the main groove 3c and the main groove 3d. The crosswise sipes 82 are wavy sipes. In the present specification, the "sipe" means a groove in which a groove width on the tread surface 2a is less than 1.6 mm, and the "slit" means a groove in which a groove width on the tread surface 2a is 1.6 mm or more.

The mediate land 4c has third and fourth slits 53 and 54 extending in a direction inclined with respect to the tire width direction D1. A plurality of the third slits 53 and a plurality of the fourth slits 54 are arranged alternately with each other in the tire circumferential direction D3. The third and fourth slits 53 and 54 are connected to the main groove 3c and the main groove 3a, and are open to the main groove 3c and the main groove 3a. Thus, the mediate land 4c has a plurality of mediate blocks 42 divided in the tire circumferential direction D3 by the third and fourth slits 53 and 54. Further, it can also be said that the mediate blocks 42 are defined by the main groove 3c and the main groove 3a and by the third and fourth slits 53 and 54.

As illustrated in FIGS. 2 and 3, the third and fourth slits 53 and 54 extend linearly. Each of the third slits 53 and each of the fourth slits 54 are parallel to each other. Further, the third and fourth slits 53 and 54 are parallel to the first and second slits 51 and 52.

Groove widths of the third slits 53 and the fourth slits 54 are narrower than the groove widths of the main grooves 3a to 3d. Further, the groove width of the third slits 53 is almost the same as the groove width of the fourth slits 54. The groove widths of the third slits 53 and the fourth slits 54 are, for example, 2 to 7 mm, and in the present embodiment, the groove width of the third slits 53 is 4.1 mm, and the groove width of the fourth slits 54 is 4.1 mm.

A groove depth of the third slits 53 and the fourth slits 54 is 70 to 95% of the groove depth of the main grooves 3a to 3d. The groove depth of the third slits 53 and the fourth slits 54 is, for example, 5.5 to 8 mm, and the groove depth of the third slits 53 and the fourth slits 54 in the present embodiment is 7 mm.

Figure 6:
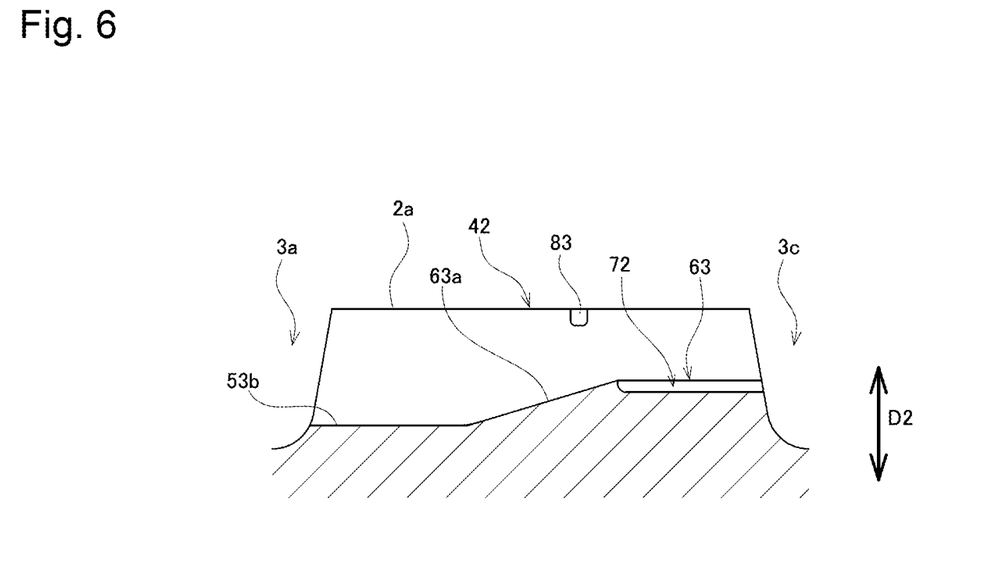
FIG. 6 is a cross-sectional view taken along a line VI-VI of the tread surface illustrated in FIG. 3.

FIG. 6 is a cross-sectional view taken along a line VI-VI of each of the third slits 53. The third slit 53 has a third raised portion 63 in which a part of a groove bottom is raised. The third raised portion 63 is disposed over the entire groove width of the third slit 53. The third raised portion 63 protrudes more outward than such a groove bottom 53b of the third slit 53 in the tire radial direction D2, and protrudes by 1.6 to 4 mm from the groove bottom 53b of the third slit 53. The third raised portion 63 of the present embodiment is higher by 2.7 mm than the groove bottom 53b. Further, the third raised portion 63 is lower than the tread surface 2a, and for example, is lower by 3 to 5.4 mm than the tread surface 2a. The third raised portion 63 of the present embodiment is lower by 4.3 mm than the tread surface 2a.

The third raised portion 63 has an inclined surface 63a inclined toward the groove bottom 53b. Thus, a rapid change of rigidity between the third raised portion 63 and the groove bottom 53b can be suppressed.

The third raised portion 63 is formed close to the main groove 3c in the third slit 53, and is in contact with the main groove 3c. Thus, deformation of the mediate block 42 present in the vicinity of the third raised portion 63 is suppressed, and therefore, a wiping phenomenon that the main groove 3c is narrowed due to the deformation of the mediate block 42 can be suppressed.

The third raised portion 63 includes a second sipe 72 extending along a direction where the third slit 53 extends. The second sipe 72 is configured so that one end thereof is open to the main groove 3c and that the other end is terminated in the third raised portion 63. A groove depth of the second sipe 72 from a top surface of the third raised portion 63 is 0.5 to 3 mm. The groove depth of the second sipe 72 in the present embodiment is 0.7 mm. Further, the groove depth of the second sipe 72 is shallower than the groove depth of the first sipe 71. A groove width of the second sipe 72 in the present embodiment is 1 mm.

Further, the second sipe 72 is formed close to the first circumferential direction side D31 in the third raised portion 63. Specifically, the second sipe 72 is formed adjacent to an obtuse corner portion 42a of the mediate block 42, which is formed by intersection of the main groove 3c and the third slit 53. Thus, rigidity of an acute corner portion 42b that faces the corner portion 42a can be prevented from being weakened.

Figure 7:
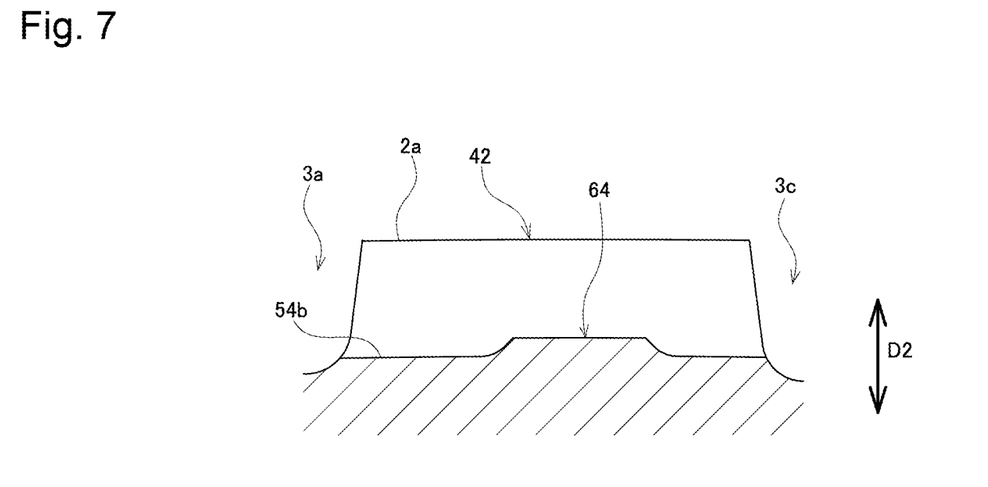
FIG. 7 is a cross-sectional view taken along a line VII-VII of the tread surface illustrated in FIG. 3.

FIG. 7 is a cross-sectional view taken along a line VII-VII of each of the fourth slits 54. Each of the fourth slits 54 has a fourth raised portion 64 in which a part of a groove bottom is raised. The fourth raised portion 64 is disposed over the entire groove width of the fourth slit 54. The fourth raised portion 64 is lower than the third raised portion 63. The fourth raised portion 64 protrudes more outward than such a groove bottom 54b of the fourth slit 54 in the tire radial direction D2, and protrudes by 0.5 to 3 mm from the groove bottom 54b of the fourth slit 54. The fourth raised portion 64 of the present embodiment is higher by 1.1 mm than the groove bottom 54b. Further, the fourth raised portion 64 is lower than the tread surface 2a, and for example, is lower by 4 to 6.5 mm than the tread surface 2a. The fourth raised portion 64 of the present embodiment is lower by 5.9 mm than the tread surface 2a.

The fourth raised portion 64 is formed in the vicinity of the center of the fourth slit 54 in the tire width direction D1. A length of the fourth raised portion 64 is shorter than a length of the third raised portion 63. Note that the fourth raised portion 64 does not include a sipe like the second sipe 72 of the third raised portion 63.

Each of the mediate blocks 42 includes the circumferential groove 83 and a plurality of crosswise sipes 84. The circumferential groove 83 is formed in the central portion in the tire width direction D1 of the mediate block 42. The circumferential groove 83 is configured so that one end thereof is open to the third slit 53 and that the other end is closed in the mediate block 42. That is, the circumferential groove 83 is open to the third slit 53, and is not open to the fourth slit 54. Thus, rigidity of the mediate block 42 can be suppressed from being increased too much by the third raised portion 63 higher than the fourth raised portion 64.

The plurality of crosswise sipes 84 are formed side by side in the tire circumferential direction D3. The crosswise sipes 84 extend so as to be parallel to the third slit 53 and the fourth slit 54. Each of the crosswise sipes 84 is configured so that one end thereof is open to the main groove 3c or the main groove 3a and that the other end is closed in the mediate block 42. The crosswise sipes 84 are wavy sipes.

The first slits 51 include first opening portions 51a open to the first main groove 3c, the second slits 52 include second opening portions 52a open to the first main groove 3c, the third slits 53 include third opening portions 53a open to the first main groove 3c, and the fourth slits 54 include fourth opening portions 54a open to the first main groove 3c. At this time, each of the first opening portions 51a is arranged closer to the fourth opening portion 54a than to the third opening portion 53a, and each of the second opening portions 52a is arranged closer to the third opening portion 53a than to the fourth opening portion 54a. That is, the first slit 51 having the first raised portion 61 that is high and the fourth slit 54 having the fourth raised portion 64 that is low are arranged close to each other, and the second slit 52 having the second raised portion 62 that is low and the third slit 53 having the third raised portion 63 that is high are arranged close to each other. Thus, a rigidity balance of the entire tire in the tire circumferential direction D3 can be improved. The fact that the opening portions are close to each other means that a distance between the opening portions in the tire circumferential direction D3 is short.

Further, the first slits 51 and the fourth slits 54 are arranged so that the first opening portions 51a and the fourth opening portions 54a are slightly offset from each ether in the tire circumferential direction D3. Thus, both of drainage and traction performance by the first slits 51 and the fourth slits 54 can be achieved.

In a similar way, the second slits 52 and the third slits 53 are arranged so that the second opening portions 52a and the third opening portions 53a are slightly offset from each other in the tire circumferential direction D3. Thus, both of drainage and traction performance by the second slits 52 and the third slits 53 can be achieved.

The first opening portions 51a are open at spots where a groove width of the main groove 3c is narrow. In a similar way, the third opening portions 53a are open at spots where the groove width of the main groove 3c is narrow. Thus, the first raised portions 61 and the third raised portions 63 are arranged so as to face the spots where the groove width of the main groove 3c is narrow, and therefore, the above-described wiping phenomenon can be effectively suppressed at such spots with a narrow groove width, where it is apprehended that the drainage may decrease due to the wiping phenomenon.

The mediate land 4d has fifth slits 55 extending in a direction inclined with respect to the tire width direction D1. The fifth slits 55 are connected to the main groove 3b and the main groove 3d, and are open to the main groove 3b and the main groove 3d. Thus, the mediate land 4d has a plurality of mediate blocks 43 divided in the tire circumferential direction D3 by the fifth slits 55.

As illustrated in FIG. 2, the fifth slits 55 extend linearly. The fifth slits 55 are parallel to the first to fourth slits 51 to 54.

Each of the fifth slits 55 has a fifth raised portion 65 in which a part of a groove bottom is raised. The fifth raised portion 65 is disposed over the entire groove width of the fifth slit 55. The fifth raised portion 65 is formed in the vicinity of the center of the fifth slit 55 in the tire width direction D1. The fifth raised portion 65 protrudes more outward than such a groove bottom 55b of the fifth slit 55 in the tire radial direction D2, and protrudes by 0.5 to 3 mm from the groove bottom 55b of the fifth slit 55. The fifth raised portion 65 of the present embodiment is higher by 1.1 mm than the groove bottom 55b. Further, the fifth raised portion 65 is lower than the tread surface 2a, and for example, is lower by 4 to 6.5 mm than the tread surface 2a. The fifth raised portion 65 of the present embodiment is lower by 5.9 mm than the tread surface 2a.

Each of the mediate blocks 43 includes the circumferential groove 85 and a plurality of crosswise sipes 86. The circumferential groove 85 is formed in the central portion in the tire width direction D1 of the mediate block 43. The circumferential groove 85 is configured so that both ends thereof are closed in the mediate block 43.

The plurality of crosswise sipes 86 are formed side by side in the tire circumferential direction D3. The crosswise sipes 86 extend so as to be parallel to the fifth slit 55. Each of the crosswise sipes 86 is configured so that one end thereof is open to the main groove 3b and that the other end is open to the main groove 3d. The crosswise sipes 86 are wavy sipes.

As described above, the pneumatic tire 1 according to the present embodiment includes:

the first main groove 3c and the second main groove 3d extending in the tire circumferential direction D3; and
the first land 4e defined by the first main groove 3c and the second main groove 3d,
wherein
the first land 4e includes the plurality of slits 51 and 52 extending across the first land 4e in the tire width direction D1 and open to the first main groove 3c and second main groove 3d,
the plurality of slits 51 and 52 include the first slits 51 each having the first raised portion 61 in which a part of the groove bottom 51b is raised and the second slits 52 each having the second raised portion 62 in which a part of the groove bottom 52b is raised to be lower than the first raised portion 61,
the first raised portion 61 includes the first sipe 71 extending along the direction where the first slit 51 extends, and
the plurality of first slits 51 and the plurality of second slits 52 are arranged alternately with each other in the tire circumferential direction D3.

The second raised portions 62 are set to be lower than the first raised portions 61, whereby the snow performance by the second slits 52 can be ensured. Meanwhile, the first raised portions 61 are set to be higher than the second raised portions 62, whereby the rigidity of the center blocks 41 which sandwich the first slits 51 therebetween can be increased to ensure the steering stability. Further, the snow performance can also be ensured by providing the first sipes 71 on the first raised portions 61. As a result, both of the snow performance and the steering stability can be achieved.

Further, the pneumatic tire 1 according to the present embodiment is configured to further include: the third main groove 3a extending in the tire circumferential direction D3; and the second land 4c defined by the first main groove 3c and the third main groove 3a, wherein the second land 4c includes the plurality of slits 53 and 54 extending across the second land 4c in the tire width direction D1 and open to the first and third main grooves 3c and 3a, the plurality of slits 53 and 54 of the second land 4c include the third slits 53 each having the third raised portion 63 in which a part of the groove bottom 53b is raised and the fourth slits 54 each having the fourth raised portion 64 in which a part of the groove bottom 54b is raised to be lower than the third raised portion 63, the third raised portion 63 includes the second sipe 72 extending along the direction where the third slit 53 extends, the plurality of third slits 53 and the plurality of fourth slits 54 are arranged alternately with each other in the tire circumferential direction D3, each of the first slits 51 includes the first opening portion 51a open to the first main groove 3c, each of the second slits 52 includes the second opening portion 52a open to the first main groove 3c, each of the third slits 53 includes the third opening portion 53a open to the first main groove 3c, each of the fourth slits 54 includes the fourth opening portion 54a open to the first main groove 3c, the first opening portion 51a is closer to the fourth opening portion 54a than to the third opening portion 53a, and the second opening portion 52a is closer to the third opening portion 53a than to the fourth opening portion 54a.

With this configuration, the first slit 51 having the first raised portion 61 that is high and the fourth slit 54 having the fourth raised portion 64 that is low are arranged close to each other, and the second slit 52 having the second raised portion 62 that is low and the third slit 53 having the third raised portion 63 that is high are arranged close to each other. Therefore, the rigidity balance of the entire tire in the tire circumferential direction D3 can be improved.

Further, the pneumatic tire 1 according to the present embodiment has a configuration, in which the first land 4e is the center land 4e closest to the tire equatorial plane S1, and the first slits 51 are narrower in width than the second slits 52.

With this configuration, the first slits 51 are narrow in width, and therefore, the rigidity of the center land 4e can be ensured.

Further, the pneumatic tire 1 according to the present embodiment has a configuration, in which the first land 4e is the center land 4e closest to the tire equatorial plane S1, the first slits 51 are narrower in width than the second slits 52, and the first sipes 71 are deeper than the second sipes 72.

With this configuration, the first sipes 71 deeper than the second sipes 72 are provided on the first raised portions 61 of the first slits 51 narrower in width than the second slits 52, whereby the center block's 41 become easy to move. Therefore, the snow performance can be increased.

Note that the pneumatic tire 1 is not limited to the configuration of the embodiment described above and is not limited to the operation and effect described above. Moreover, as a matter of course, the pneumatic tire 1 can be modified in various ways within the scope without departing from the spirit of the present invention. For example, the configuration, the method, and the like of each of the plurality of embodiments described above may be arbitrarily adopted and combined, and it is a matter of course that one or more configurations, methods, and the like according to various modification examples described below may be arbitrarily selected and adopted in the configuration, method, and the like according to the embodiment described above.

(1) The pneumatic tire 1 according to the above-described embodiment is configured to include: the third main groove 3a extending in the tire circumferential direction D3; and the second land 4c defined by the first main groove 3c and the third main groove 3a, wherein the second land 4c includes the plurality of slits 53 and 54 extending across the second land 4c in the tire width direction D1 and open to the first and third main grooves 3c and 3a, the plurality of slits 53 and 54 of the second land 4c include the third slits 53 each having the third raised portion 63 in which a part of the groove bottom 53b is raised and the fourth slits 54 each having the fourth raised portion 64 in which a part of the groove bottom 54b is raised to be lower than the third raised portion 63, the third raised portion 63 includes the second sipe 72 extending along the direction where the third slit 53 extends, the plurality of third slits 53 and the plurality of fourth slits 54 are arranged alternately with each other in the tire circumferential direction D3, each of the first slits 51 includes the first opening portion 51a open to the first main groove 3c, each of the second slits 52 includes the second opening portion 52a open to the first main groove 3c, each of the third slits 53 includes the third opening portion 53a open to the first main groove 3c, each of the fourth slits 54 includes the fourth opening portion 54a open to the first main groove 3c, the first opening portion 51a is closer to the fourth opening portion 54a than to the third opening portion 53a, and the second opening portion 52a is closer to the third opening portion 53a than to the fourth opening portion 54a. However, the pneumatic tire 1 is not limited to such a configuration. For example, in the tire circumferential direction D3, the first opening portions 51a and the second opening portions 52a may be individually arranged on the central portions between the third opening portions 53a and the fourth opening portions 54a.

(2) Further, the pneumatic tire 1 according to the above-described embodiment has a configuration, in which the first land 4e is the center land 4e closest to the tire equatorial plane S1, and the first slits 51 are narrower in width than the second slits 52. However, the pneumatic tire 1 is not limited to such a configuration. For example, such a configuration in which the first slits 51 have the same width as that of the second slits 52 may be adopted.

(3) Further, the pneumatic tire 1 according to the above-described embodiment has a configuration, in which the first land 4e is the center land 4e closest to the tire equatorial plane S1, the first slits 51 are narrower in width than the second slits 52, and the first sipes 71 are deeper than the second sipes 72. However, the pneumatic tire 1 is not limited to such a configuration. For example, such a configuration in which the first slits 51 have the same width as that, of the second slits 52, and the first sipes 71 have the same depth as that of the second sipes 72 may be adopted.

(4) Further, in the above-described embodiment, though the description has been given on the assumption that the center land 4e corresponds to the "first land" and that the main grooves 3c and 3d correspond to the "first main groove and second main groove", the pneumatic tire 1 is not limited to this. The mediate land 4c may correspond to the "first land", and the main grooves 3c and 3a may correspond to the "first main groove and second main groove". At this time, the third slits 53 correspond to the "first slits", the fourth slits 54 correspond to the "second slits", the third raised portions 63 correspond to the "first raised portions", the fourth raised portions 64 correspond to the "second raised portions", and the second sipes 72 correspond to the "first sipes."

(5) Moreover, the pneumatic tire 1 according to the above-described embodiment has a configuration, in which the land 4e that intersects with the tire equatorial plane 31 is one, and the center land 4e disposed closest to the tire equatorial plane S1 is that land. However, the pneumatic tire 1 is not limited to such a configuration.

For example, such a configuration in which the land that intersects with the tire equatorial plane S1 is zero for example may toe adopted, or for example, such a configuration in which the number of such lands is two may be adopted. In these configurations, the number of center lands 4e arranged closest to the tire equatorial plane S1 is two, and the first and second center lands 4e and 4e just need to have a predetermined configuration.

The predetermined configuration is a configuration in which the first and second center lands 4e and 4e include the plurality of slits 51 and 52 extending across the first and second lands 4e and 4e in the tire width direction D1 and open to the first main groove and the second main groove, the plurality of slits 51 and 52 include the first slits 51 each having the first raised portion 61 in which a part of the groove bottom 51b is raised and the second slits 52 each having the second raised portion 62 in which a part of the groove bottom 52b is raised to be lower than the first raised portion 61, the first raised portion 61 includes the first sipe 72 extending along the direction where the first slit 51 extends, and the plurality of first slits 51 and the plurality of second slits 52 are arranged alternately with each other in the tire circumferential direction D3.

What is claimed is:

1. A pneumatic tire comprising:
a first main groove and a second main groove extending in a tire circumferential direction; and
a first land defined by the first main groove and the second main groove,
wherein
the first land includes a plurality of slits extending across the first land in a tire width direction and open to the first main groove and the second main groove,
the plurality of slits include first slits each having a first raised portion in which a part of a groove bottom is raised and second slits each having a second raised portion in which a part of a groove bottom is raised to be lower than the first raised portion,
the first raised portion includes a first sipe extending along a direction where the first slits extend, and
the first slits and the second slits are arranged alternately with each other in the tire circumferential direction.

2. The pneumatic tire according to claim 1, further comprising:
a third main groove extending in the tire circumferential direction; and
a second land defined by the first main groove and the third main groove, wherein
the second land includes a plurality of slits extending across the second land in the tire width direction and open to the first main groove and the third main groove,
the plurality of slits of the second land include third slits each having a third raised portion in which a part of a groove bottom is raised and fourth slits each having a fourth raised portion in which a part of a groove bottom is raised to be lower than the third raised portion,
the third raised portion includes a second sipe extending along a direction where the third slits extend,
the third slits and the fourth slits are arranged alternately with each other in the tire circumferential direction,
each of the first slits includes a first opening portion open to the first main groove,
each of the second slits includes a second opening portion open to the first main groove,
each of the third slits includes a third opening portion open to the first main groove,
each of the fourth slits includes a fourth opening portion open to the first main groove,
the first opening portion is closer to the fourth opening portion than to the third opening portion, and
the second opening portion is closer to the third opening portion than to the fourth opening portion.

3. The pneumatic tire according to claim 2, wherein the third raised portion is formed close to the first main groove in the third slits, and is in contact with the first main groove.

4. The pneumatic tire according to claim 3, wherein, in the second sipe, one end close to the first main groove is open, and another end close to the third main groove is terminated in the third raised portion.

5. The pneumatic tire according to claim 3, wherein the second sipe is formed adjacent to an obtuse corner portion of a block, the corner portion being formed by intersection of the first main groove and the third slit.

6. The pneumatic tire according to claim 2, wherein
the first slit and the fourth slit are arranged so that the first opening portion and the fourth opening portion are offset from each other in the tire circumferential direction, and
the second slit and the third slit are arranged so that the second opening portion and the third opening portion are offset from each other in the tire circumferential direction.

7. The pneumatic tire according to claim 1, wherein the first raised portion is formed close to the first main groove in the first slits, and is in contact with the first main groove.

8. The pneumatic tire according to claim 7,
wherein, in the first sipe, one end close to the second main groove is open, and another end close to the first main groove is terminated in the first raised portion.

9. A pneumatic tire comprising:
a first main groove and a second main groove extending in a tire circumferential direction; and
a first land defined by the first main groove and the second main groove,
wherein
the first land includes a plurality of slits extending across the first land in a tire width direction and open to the first main groove and the second main groove,
the plurality of slits include first slits each having a first raised portion in which a part of a groove bottom is raised and second slits each having a second raised portion in which a part of a groove bottom is raised to be lower than the first raised portion,
the first raised portion includes a first sipe extending along a direction where the first slits extend, and
the first slits and the second slits are arranged alternately with each other in the tire circumferential direction,
wherein the first land is a center land closest to a tire equatorial plane, and
the first slit is narrower in width than the second slit.

10. A pneumatic tire comprising:
a first main groove and a second main groove extending in a tire circumferential direction; and
a first land defined by the first main groove and the second main groove,
wherein
the first land includes a plurality of slits extending across the first land in a tire width direction and open to the first main groove and the second main groove,
the plurality of slits include first slits each having a first raised portion in which a part of a groove bottom is raised and second slits each having a second raised portion in which a part of a groove bottom is raised to be lower than the first raised portion,
the first raised portion includes a first sipe extending along a direction where the first slits extend, and
the first slits and the second slits are arranged alternately with each other in the tire circumferential direction,
the pneumatic tire further comprises:
a third main groove extending in the tire circumferential direction; and
a second land defined by the first main groove and the third main groove, wherein
the second land includes a plurality of slits extending across the second land in the tire width direction and open to the first main groove and the third main groove,
the plurality of slits of the second land include third slits each having a third raised portion in which a part of a groove bottom is raised and fourth slits each having a fourth raised portion in which a part of a groove bottom is raised to be lower than the third raised portion,
the third raised portion includes a second sipe extending along a direction where the third slits extend,
the third slits and the fourth slits are arranged alternately with each other in the tire circumferential direction,
each of the first slits includes a first opening portion open to the first main groove,
each of the second slits includes a second opening portion open to the first main groove,
each of the third slits includes a third opening portion open to the first main groove,
each of the fourth slits includes a fourth opening portion open to the first main groove,
the first opening portion is closer to the fourth opening portion than to the third opening portion, and
the second opening portion is closer to the third opening portion than to the fourth opening portion,
wherein the first land is a center land closest to a tire equatorial plane,
the first slit is narrower in width than the second slit, and
the first sipe is deeper than the second sipe.

* * * * *